March 14, 1933.  P. M. SALERNI  1,901,193

POWER TRANSMISSION MECHANISM

Filed Oct. 8, 1930  12 Sheets-Sheet 1

Inventor:
Piero Mariano Salerni
By Pennie Davis Marvin & Edmonds
attorneys

March 14, 1933. P. M. SALERNI 1,901,193

POWER TRANSMISSION MECHANISM

Filed Oct. 8, 1930   12 Sheets-Sheet 5

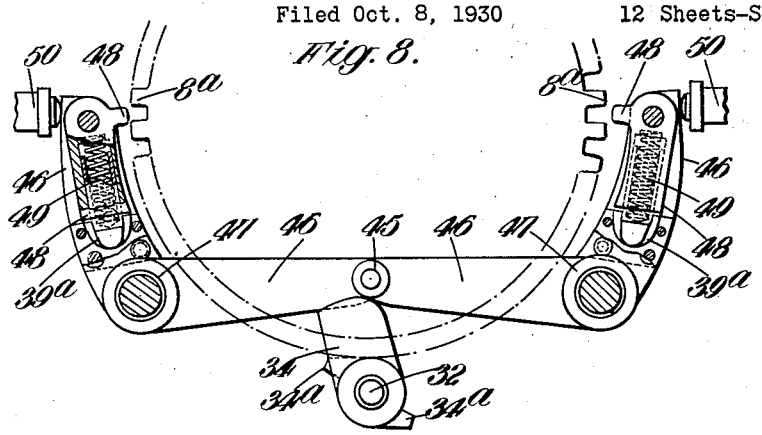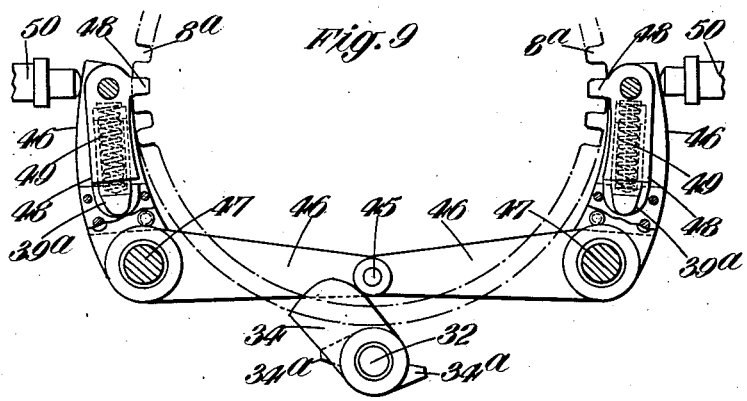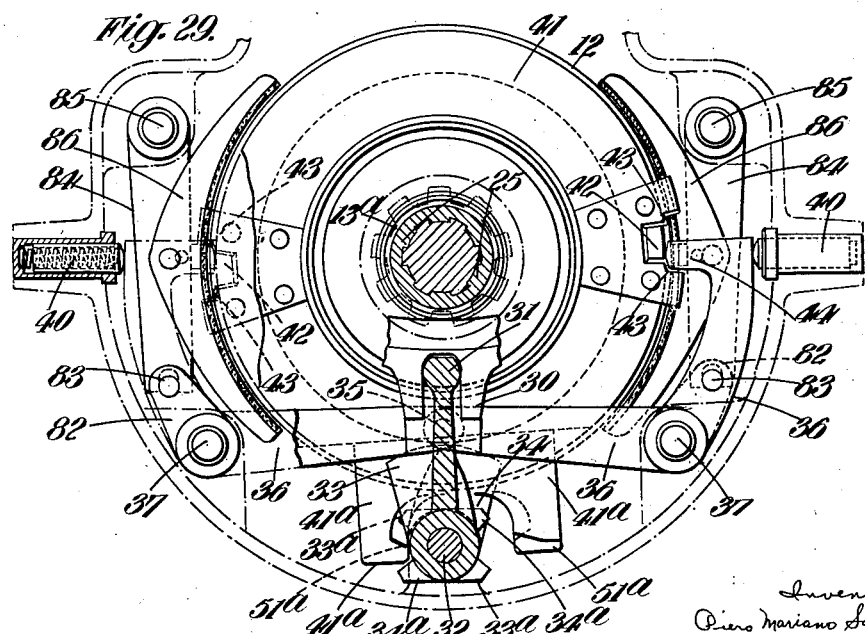

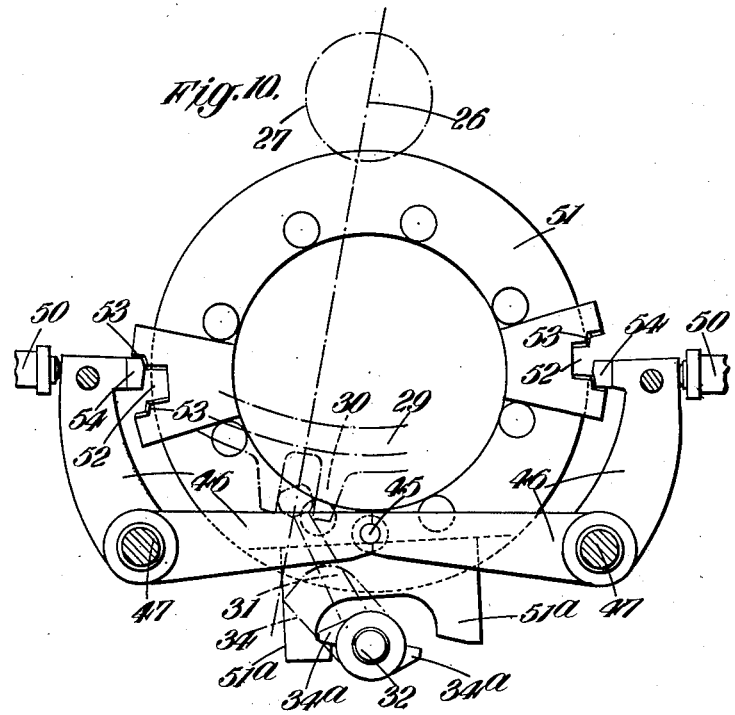
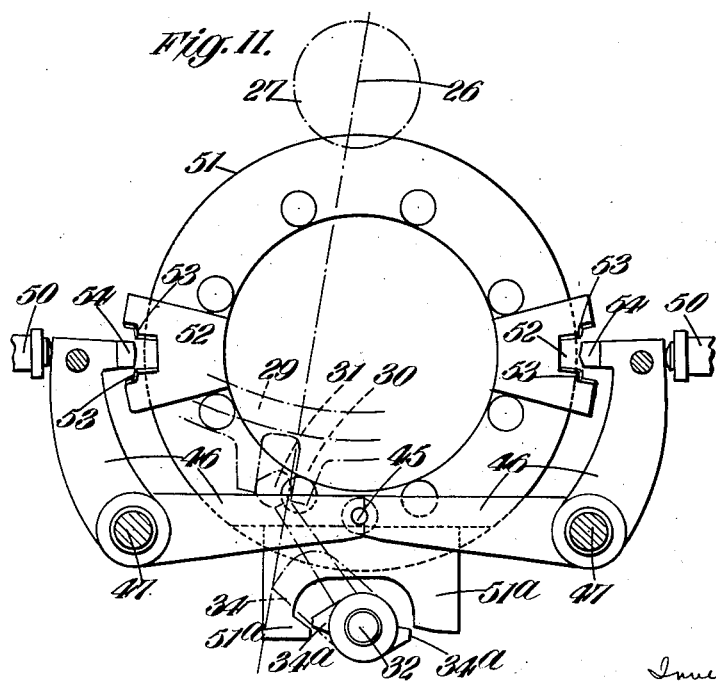

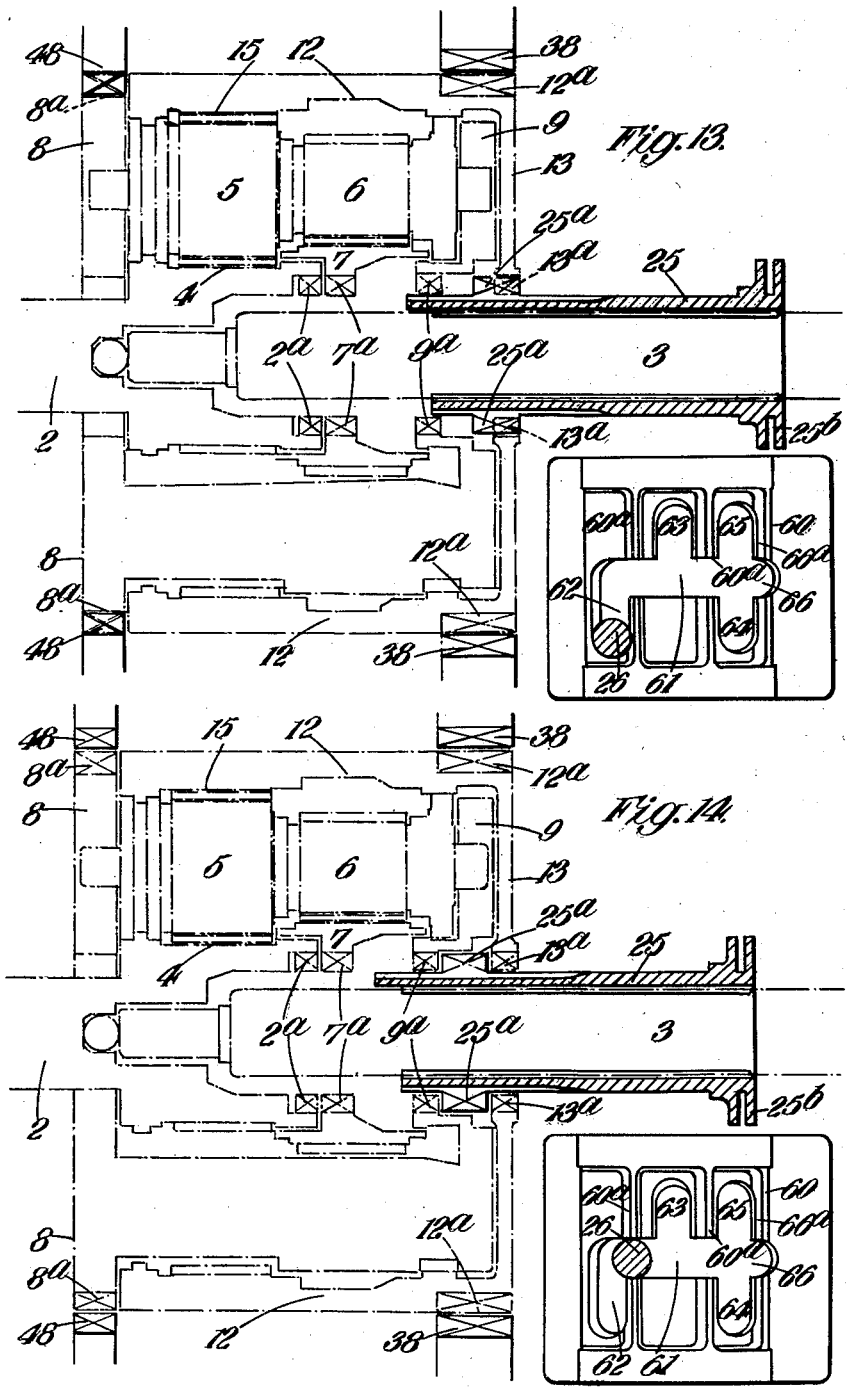

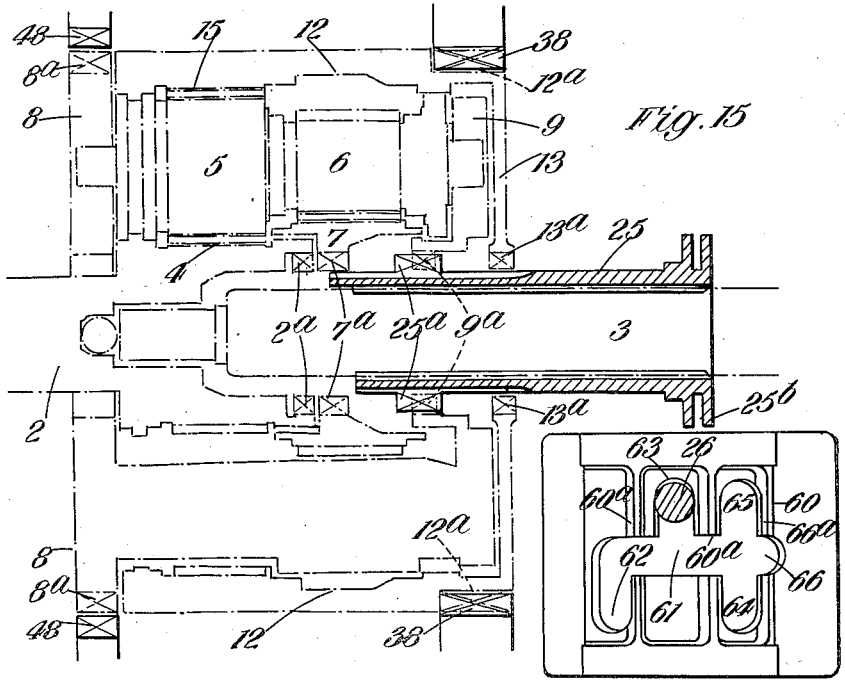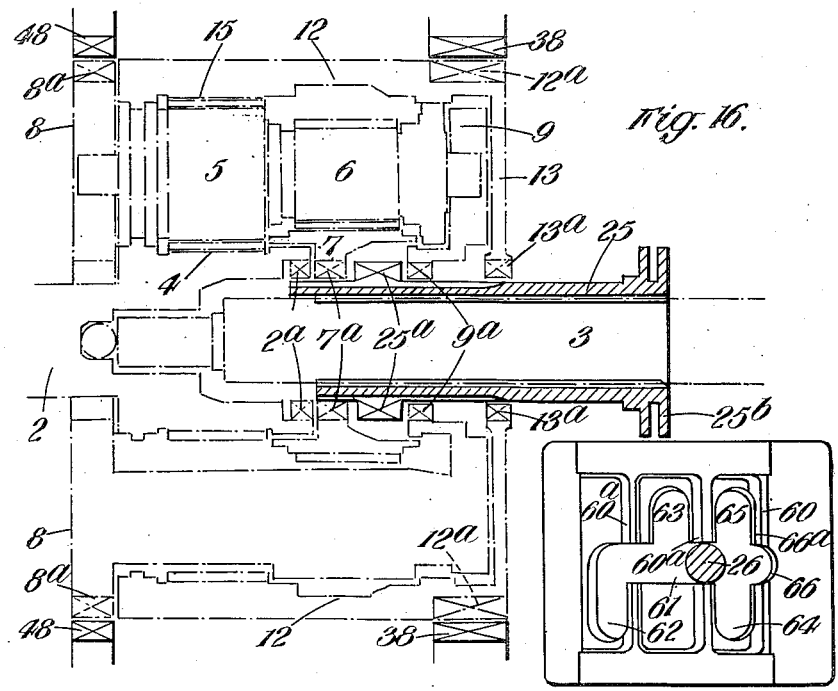

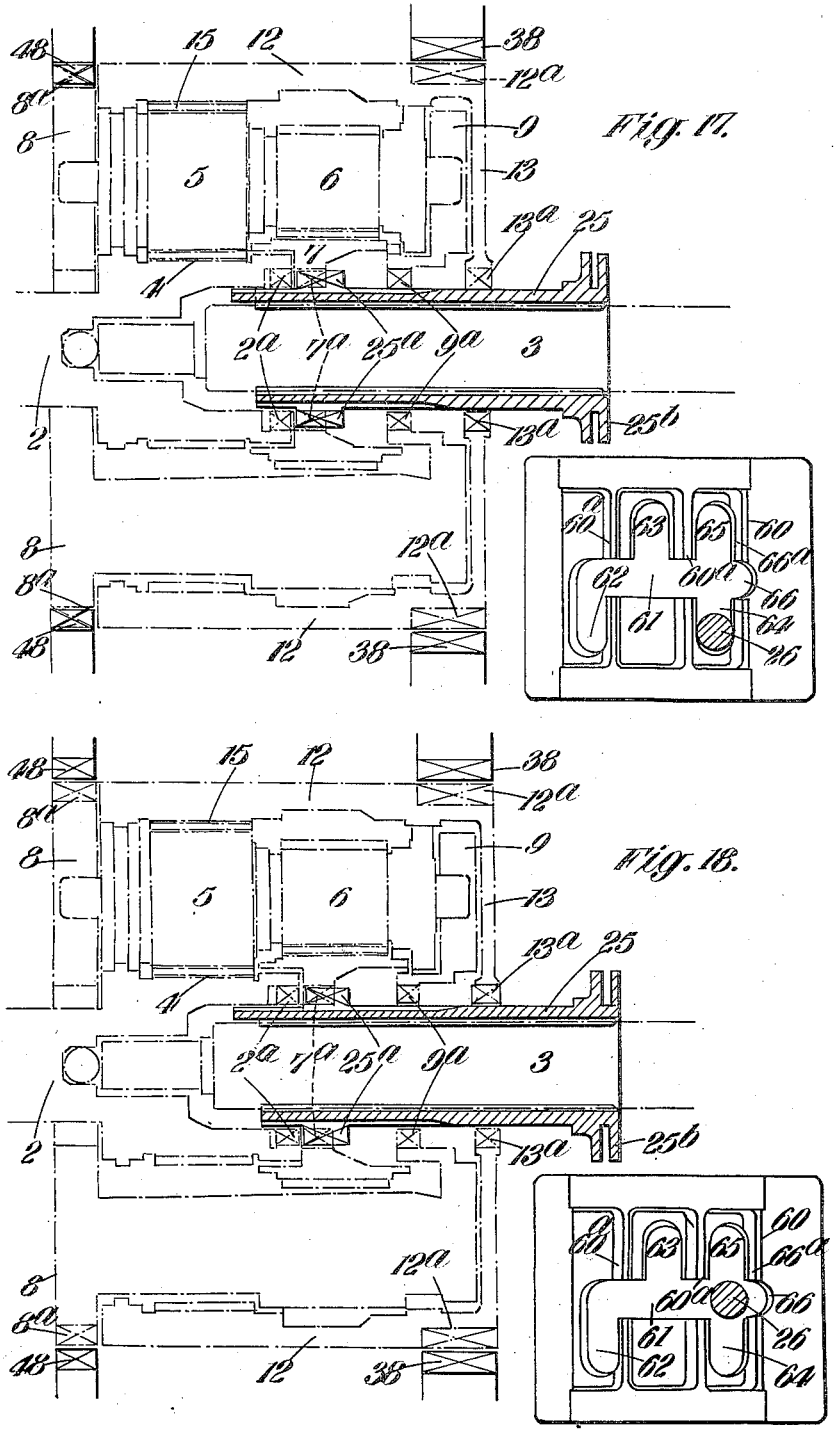

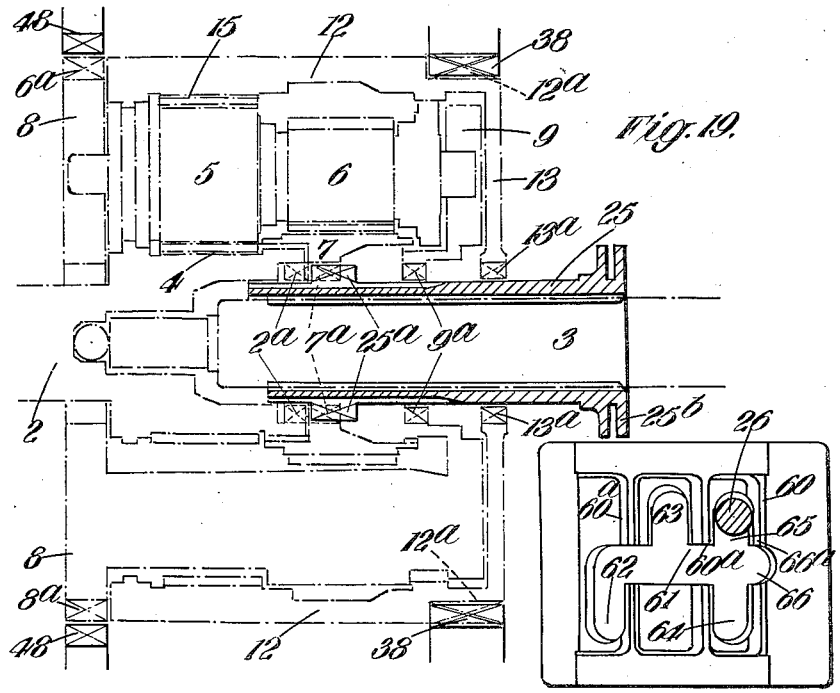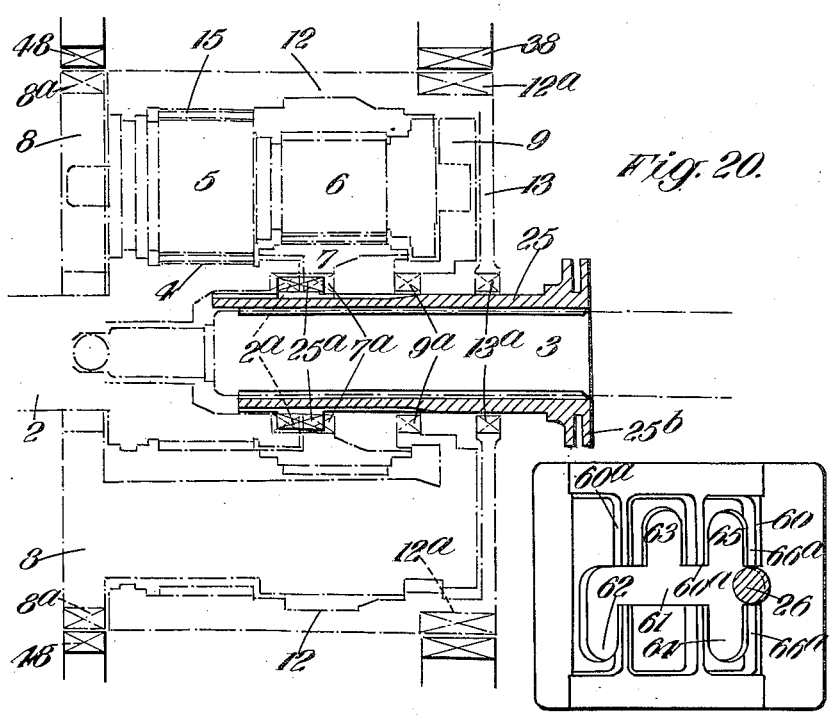

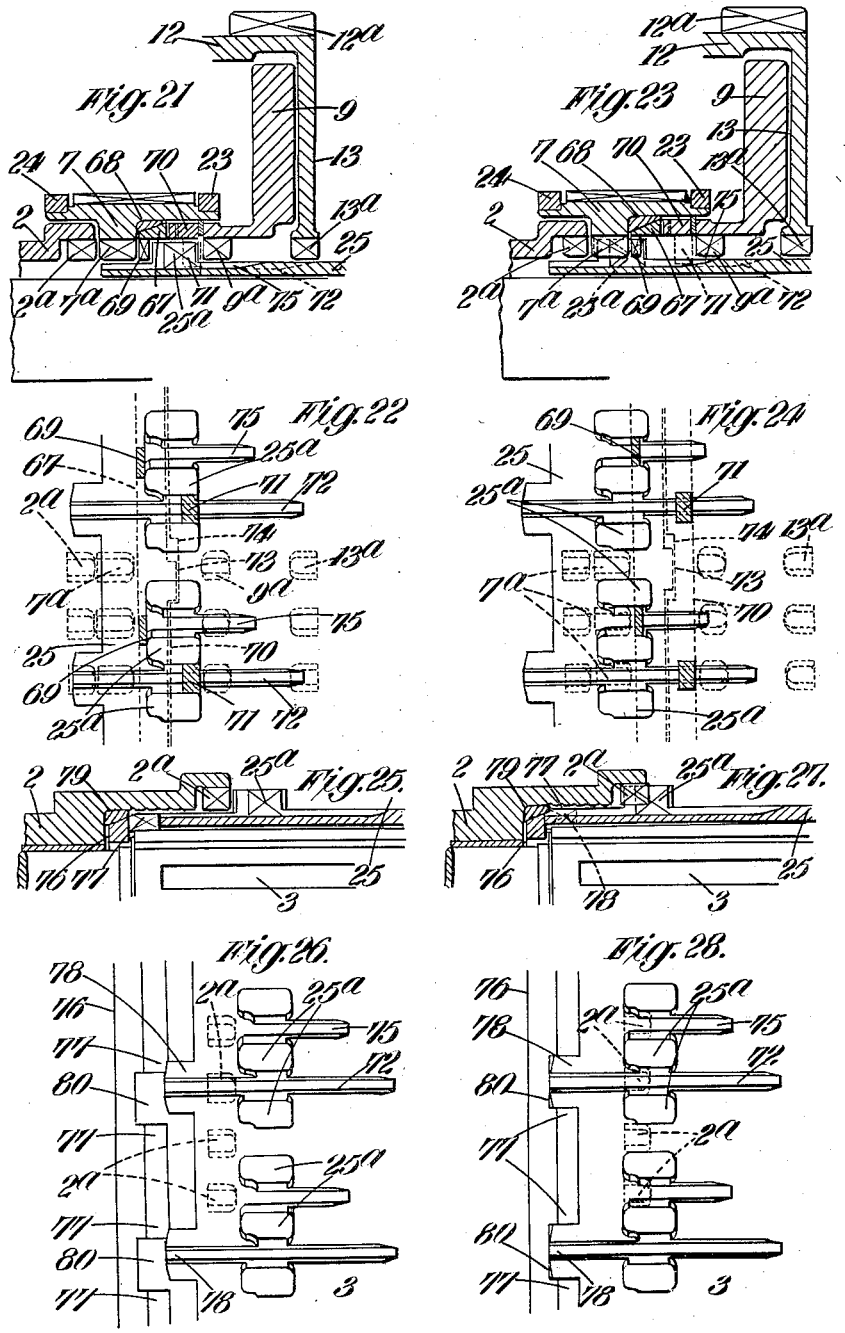

Patented Mar. 14, 1933

1,901,193

UNITED STATES PATENT OFFICE

PIERO MARIANO SALERNI, OF WESTMINSTER, LONDON, ENGLAND

POWER TRANSMISSION MECHANISM

Application filed October 8, 1930, Serial No. 487,186, and in Great Britain October 16, 1929.

This invention relates to power transmission mechanism and has more particular though not exclusive reference to change speed gearing in which the gear wheels thereof are in constant mesh. The invention is more especially concerned with epicyclic or differential gearing or combined epicyclic and differential gearing, and one of the objects of the present invention is to enable the various parts of the gearing to be supported in such manner as to avoid the use of bronze bushes and special lubricating means such as are usually employed in this type of gearing.

According to this invention the different rotating members or gear wheels have associated therewith intersupporting or co-acting rollers, circular bearing surfaces, tracks or the like. Such rollers, bearing surfaces, tracks or the like support one or more of the rotating members or gear wheels and ensure proper meshing of the teeth of the gear wheels or toothed members. These rollers are preferably such that they are co-axial with the gear wheels or members with which they are associated, and preferably the diameters of these rollers or bearing surfaces are equal to the pitch diameters of the gear wheels or members with which they are co-axially aligned. Generally in the case of internal or epicylic gearing, certain of the gear wheels may have associated therewith rollers or the like that can travel around a central roller or bearing surface, or more than one, and an external ring or track may be provided around the outer rollers, which track may itself be associated with another member of the gearing, for example an internally toothed annulus of an epicylic gearing. The inter-engaging and co-acting rollers not only ensure proper meshing of the teeth of the gear wheels or toothed members under all conditions, but also enable separation loads, due to the tendency of the gear teeth to separate, and also centrifugal loads to be taken by the external ring or track so as to relieve the other parts of these loads entirely or mainly. A further feature of the invention is that certain gear wheels, for example the driven sun gear wheels of an internal or epicyclic gearing can be made of annular formation to enable clutching means for engaging different gear wheels to pass into and through the same, and such annular driven member may if desired be supported by external rollers or bearing surfaces. In one construction of epicyclic gearing, a driving sun wheel has associated therewith a roller support around which travel rollers associated with the larger planets of compound planet pinions, which larger planets are in mesh with the driving sun wheel and also engage with and travel on an internal roller track in an internally toothed member or annulus, the said roller supports, planet rollers and the annulus roller track having diameters which are respectively equal to the pitch circle diameters of the driving sun wheel, the planet pinion in mesh therewith and the internal annulus teeth engaged by the planet pinions. A driven sun wheel which may be of annular formation as aforesaid, is externally supported by inter-engaging and co-acting rollers and bearing surfaces which are preferably of a diameter equal to the pitch circle diameter of the teeth of this sun wheel and are engaged or supported by external rollers or bearing surfaces associated with the smaller planet pinions in mesh with the driven sun wheel, these smaller planet rollers or bearing surfaces being of a diameter equal to the pitch circle of the smaller planet pinions. As aforesaid the various inter-engaging and co-acting rollers ensure proper meshing of the teeth whilst it also enables the bearings of the compound planet pinions in the planet carrying member or cage to be relieved of separation loads and centrifugal loads. Such roller bearing surfaces or the like form journal bearings for the parts, and according to a further feature of this invention rollers or circular bearing surfaces, flanges, tracks and the like may be provided to serve as thrust bearings or as means for preventing undesirable axial displacement of the parts. These thrust bearings which are preferably in the form of interengaging flanges or side circular bearing surfaces are located at or about the pitch circle diameters of the gear wheels with which they are associated. The said flanges or circular bearing surfaces may be associated with the pitch circle rollers, tracks or the like which form the journal bearings as hereinbefore referred to, so as to form or provide combined journal bearings and thrust bearings, which are especially suitable in cases where the gear wheels or toothed members of the gearing are provided with teeth of helical formation. The features according to the present invention may be combined with any or all of the features covered in my English patent applications Nos. 31,478 of 1929, 23,598 of 1930 or 23,599 of 1930.

In order that the said invention may be clearly understood and readily carried into effect, the same will now be more fully described with reference to the accompanying drawings, in which:—

Figure 4a is an enlarged sectional view of part of the mechanism shown in Figure 4.

Figures 8 to 11 are detail views (looking in the direction of the arrow Z in Figure 3) of parts of the controlling or operating mechanism shown in different positions.

Figure 12 is a detail view hereinafter referred to.

Figures 13 to 20 are diagrams illustrating the gearing (mainly in dotted lines) and the controlling or operating lever in different positions in its gate.

Figures 21 to 28 are diagrammatic views of the internal synchronizing or balking mechanism.

Figure 29 is an end view similar to Figure 4 illustrating a modification hereinafter referred to.

Figure 1:
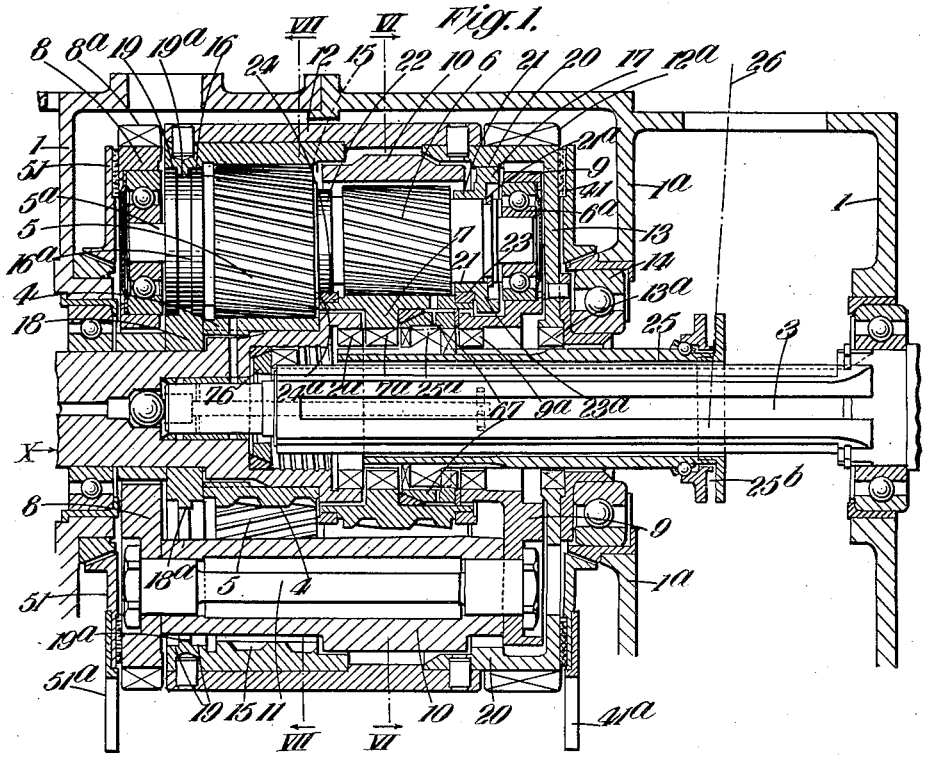
Figure 1 is a vertical longitudinal sectional view of one construction of the differential or epicyclic gearing embodying this invention.
Figure 2:
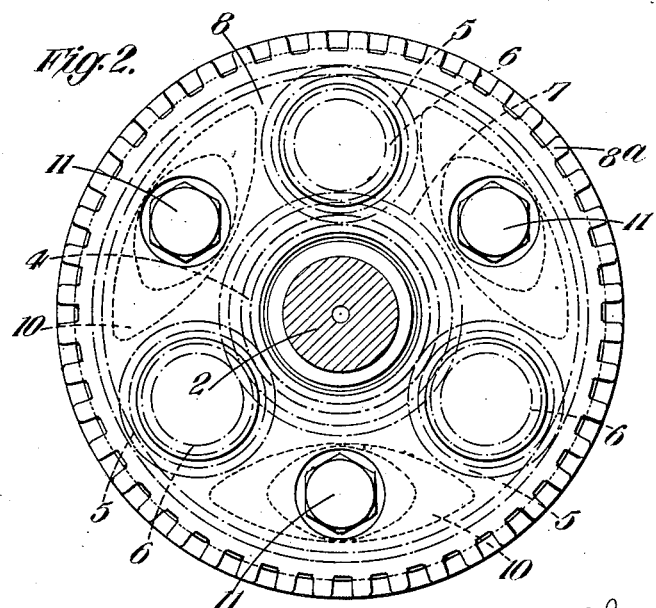
Figure 2 is an end view looking in the direction of the arrow X in Figure 1.
Figure 6:
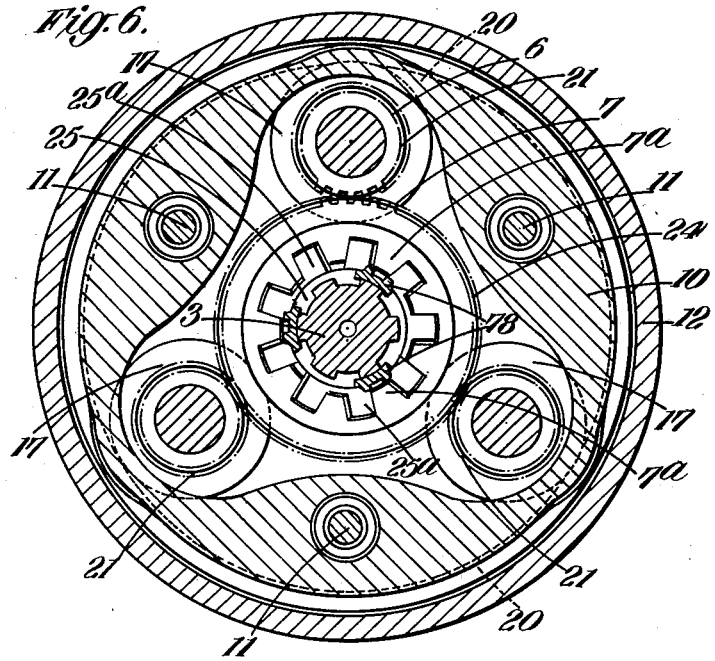
Figures 6 and 7 are transverse sectional views taken on the lines VI—VI and VII—VII, of Figure 1.
Figure 7:
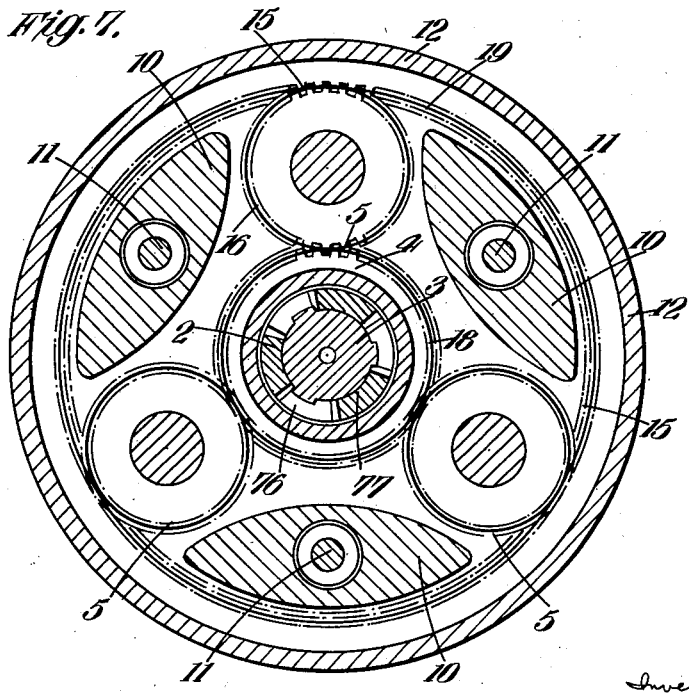

The gearing is contained in a casing 1 in which at one end the driving shaft 2 is supported in a ball bearing, the driven shaft 3 being supported in a ball bearing at the other end of the casing 1. The inner or free end of the driven shaft 3 is formed with a spigot that fits within the inner end of the driving shaft 2 as shown in Figure 1. The driving shaft 2 is formed with or has secured thereon a driving sun gear wheel 4 which is in mesh with the larger planet pinions 5 of preferably three compound planet pinions (see Figures 2, 6 and 7) of which the smaller pinions 6 are in mesh with a driven sun gear wheel 7 of annular or hollow formation as shown. The compound planet pinions 5, 6, are supported at their ends in ball bearings 5a and 6a mounted in end plates 8 and 9 that form part of a cage or carrier, the body 10 of which is illustrated in perspective in Figure 12 the said end plates 8 and 9 in the example shown being secured to the cage body 10 by means of bolts 11 that extend through substantial bosses on the cage body and are secured in position by nuts so as to clamp the end plates securely to the body 10 the whole forming the planet cage or carrier which will hereinafter be referred to as the cage 10. The body and the end plates are preferably made of duralumin. Surrounding the said cage 10 is an annulus 12 which at the rear end is formed or provided with a plate 13, whose inner part is mounted in a ball bearing 14 supported in a diaphragm or web 1a forming part of the casing 1 the said annulus 12 being provided with internal teeth 15 with which mesh the larger planet pinions 5 of the three compound planet pinions.

In the example illustrated the teeth of the different gear wheels and pinions are of helical formation. At or near the ends of each of the compound planet pinions are provided rollers or circular bearing surfaces 16 and 17 the diameters of which are equal to the diameters of the pitch circles of the larger planet pinions 5, the three rollers 16 being adapted to travel around a roller support or circular bearing surface 18 which is provided around the driving shaft 2 and is of a diameter equal to the diameter of the pitch circle of the driving sun wheel 4. The said rollers 16 and 17 also contact with and travel around roller tracks or bearings 19 and 20 respectively, provided on the internal surface of the aforesaid annulus 12 the diameters of the said roller tracks 19 and 20 being equal to the diameter of the pitch circle of the internal teeth 15 of the annulus. The said rollers 17 are each provided with a reduced circular protion 21 constituting another roller or bearing surface and having a diameter equal to the diameter of the pitch circle of the smaller planet pinion 6. Each compound planet is also provided with another roller or circular bearing surface 22 having a diameter equal to that of the reduced roller portion 21 of the roller 17. The driven sun wheel 7 is provided at its sides with rollers or circular bearing surfaces 23 and 24 which are each of a diameter equal to the pitch circle of its teeth and which engage respectively with the rollers or bearing surfaces 21 and 22 on the three compound planet pinions so that the driven sun wheel (which is of annular formation as aforesaid) is supported within and by the said rollers or supports 21 and 22 on the equi-spaced compound planet pinions. The rollers or bearing surfaces 23 and 24 particularly the former are made separate from the driven sun wheel 7 and the compound roller support 17 and 21 is made separate from the compound planet pinion as shown in Figure 1, in order to facilitate assembly of the parts. The compound roller support 17 and 21 is held against endwise displacement on the compound planet by a spring ring 21a. The internal gearing and associated parts after assembly are finally held in position by the end cage plate 9 which is bolted to the cage 10 and the other cage plate 8 by the bolts 11. The various pitch circle rollers, roller tracks and supports provide anti-frictional journals or bearing which properly support the various parts and ensure correct meshing of the gear teeth while they relieve the bearings 5a and 6a of the compound planet pinions of separation loads and centrifugal loads and it is this construction that renders possible the use of the annular driven sun wheel 7 which having no hub or similar central support enables means to be provided for passing into or through it to connect or engage different parts of the gearing as hereinafter described. In the example shown the said pitch circle rollers and the like are so constructed as to serve as thrust bearings and to prevent undesirable axial or endwise displacement by co-operating with side supports or surfaces, flanges or the like at or near the pitch circle diameters on adjacent and coacting rollers or the like. For this purpose the roller support 18 and the roller track 19 are provided with flanges 18a and 19a that fit in grooves 16a in the roller 16, and the roller 23 engages with side surfaces or flanges at 23a on or adjacent to the roller 17 whilst the roller 24 engages with side surfaces or flanges at 24a on or adjacent to the roller 22. In this manner the parts are held against axial or endwise thrust or displacement in both directions. This construction also permits of the use of helical gear wheels and pinions without the use of ordinary thrust bearings. In assembling the rollers 16 and the compound planets 5 and 6 they are placed within the track 19 and internal teeth 15 in the annulus respectively so as to lie against each other and after placing the roller supports 18 and 24 in the central position, they can be rolled around these supports into their proper positions to permit of other parts being fitted or assembled.

Figure 3:
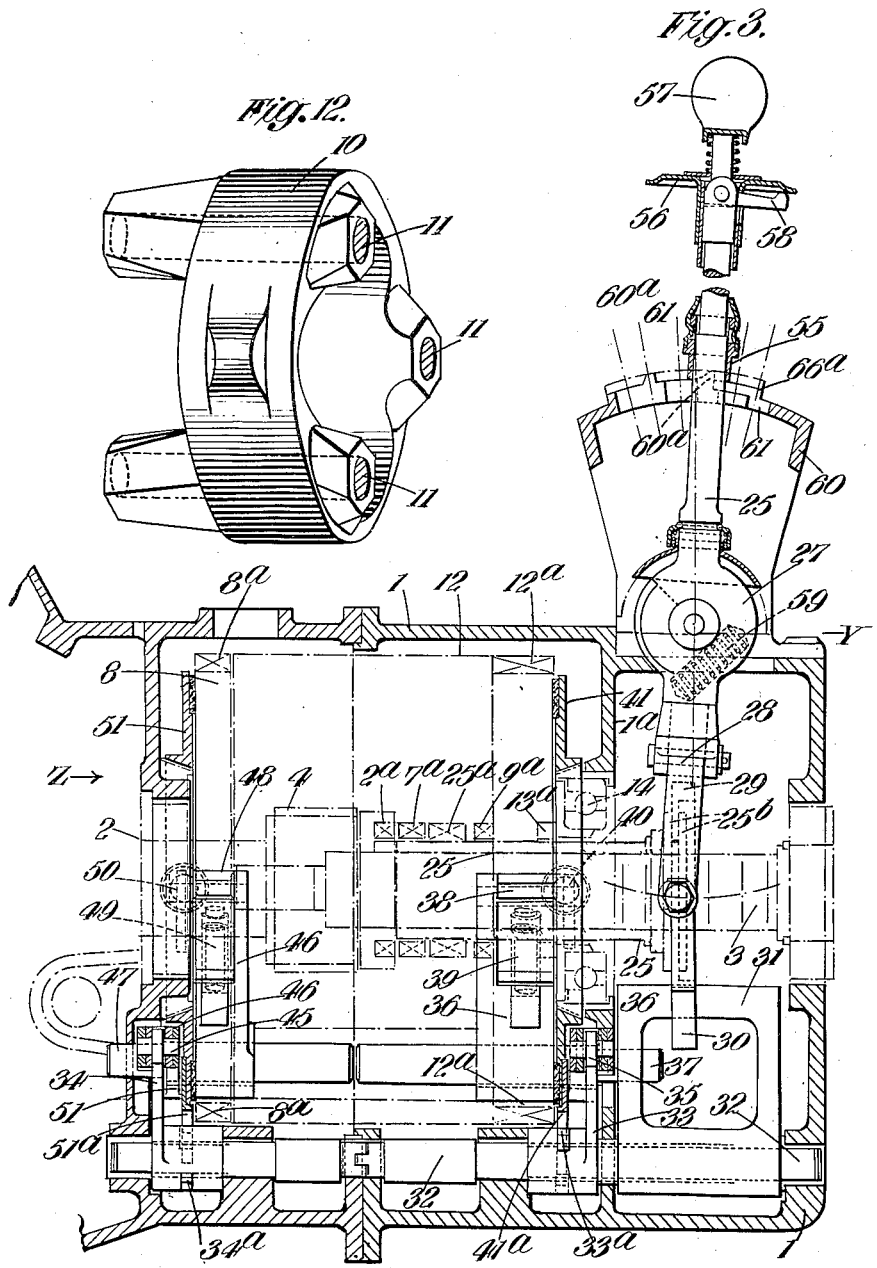
Figure 3 is a vertical sectional view showing more particularly the controlling or operating mechanism for actuating the gearing, the outline of the latter being represented in dotted lines in this figure.
Figure 4:
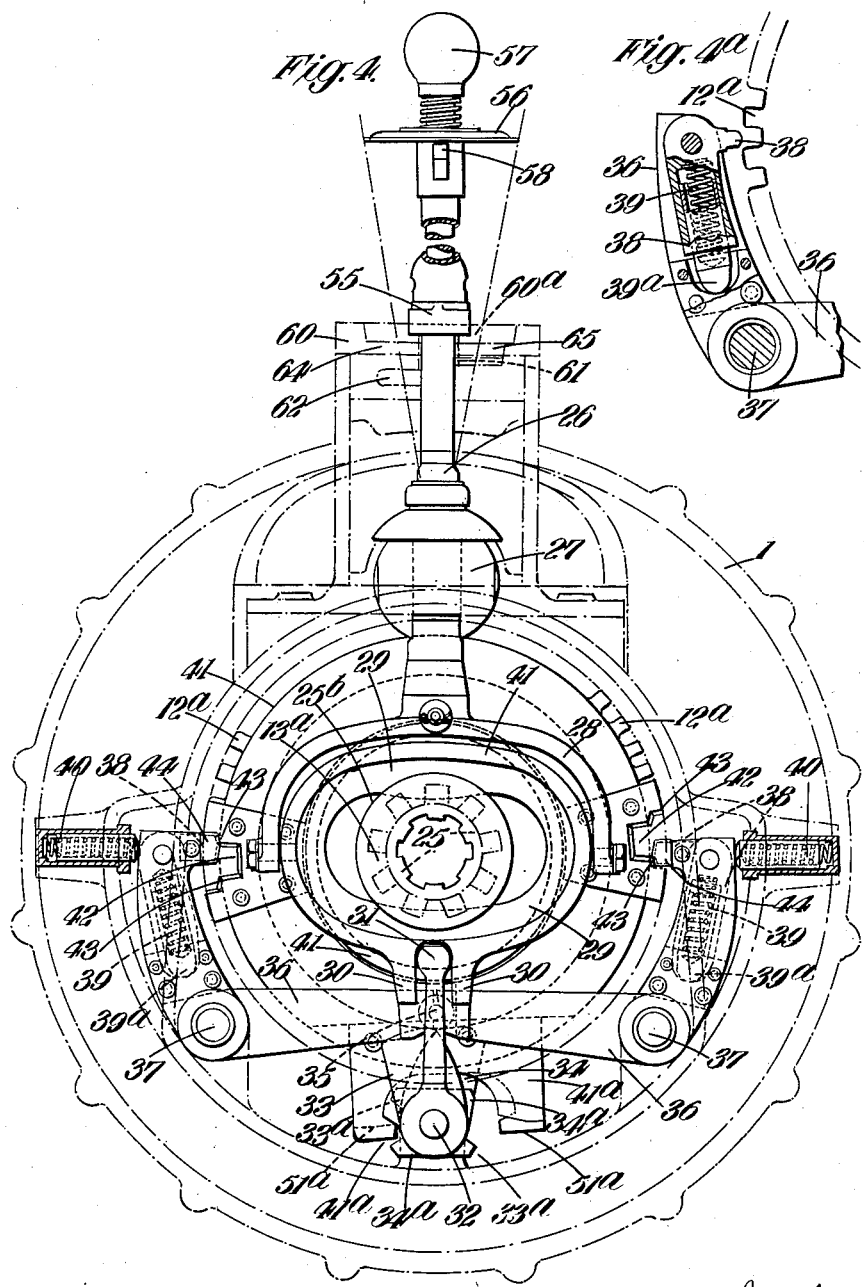
Figure 4 is an end view of the controlling or operating mechanism looking in the direction of the arrow Y in Figure 3.
Figure 5:
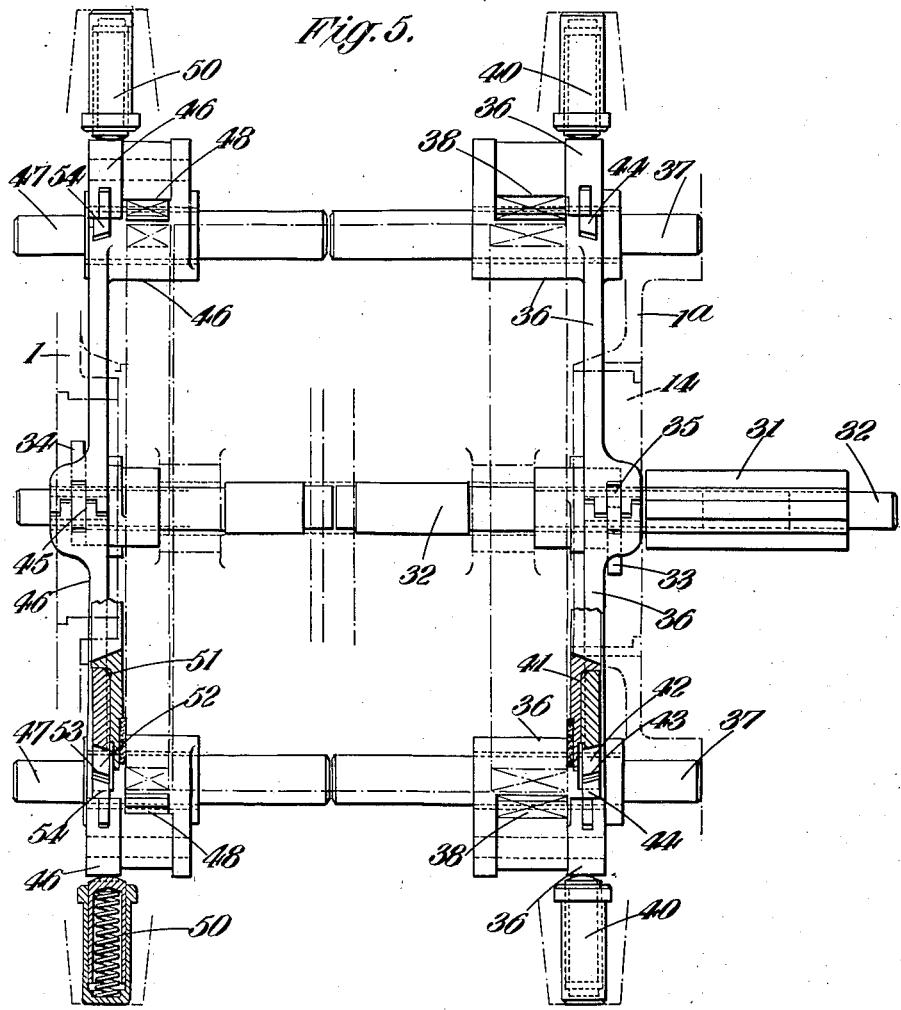
Figure 5 is a plan view partly in section of part of the controlling or operating mechanism.

The inner end of the driving shaft 2, the annular driven sun wheel 7, the end cage plate 9 and the annulus plate 13, are provided with internally disposed dogs or teeth 2a, 7a, 9a and 13a respectively. Splined around the said driven shaft 3 is a slidable sleeve 25 having external dogs 25a which are adapted to engage at different times with any one of the sets of dogs 2a, 7a, 9a, and 13a by slidable movement of the sleeve in either direction, for which purpose the sleeve can be slidably moved in and through the annular driven sun wheel 7. The said dogs 25a are preferably but not necessarily of such length that whilst they can engage with the dogs 7a, they can when engaging with the dogs 2a also engage with the dogs 7a for the purpose of locking the gearing so that it will rotate bodily as hereinafter described. Balking or synchronizing means hereinafter more fully referred to are provided for the purpose of preventing the dogs 25a on the slidable sleeve 25 from engaging with the dogs 7a on the driven sun wheel 7 or with the dogs 2a on the driven shaft 2, until such time as the rotating members to be engaged attain rotational synchronism. On the exterior of the cage plate 8, peripheral dogs or teeth 8a are formed and similar dogs or teeth 12a are formed on the rear part of the annulus, locking means being provided for engaging with these external dogs or teeth to hold either the cage 10 or the annulus 12 against rotation as hereinafter described. The sleeve 25 is slidably moved for the purpose of engaging its dogs 25a with any of the sets of dogs 2a, 7a, 9a or 13a, by means of an operating lever 26 (see Figures 3 and 4), which is mounted on a ball joint 27 so as to be capable of movement in opposite directions in the plane of the longitudinal axis of the gearing or in different planes across the said axis. The lower part of the lever 26 is formed with a fork 28 to which is pivotally attached a slotted plate 29 that is loosely connected with the said sleeve 25 by means of collars 25b in such manner that the plate 29 can be angularly moved relatively to the collars 25b by transverse movement of the operating lever 26, the said collars however enabling the sleeve 25 to be slidably moved when the operating lever is moved in the longitudinal direction. On the lower part of the said plate 29 is a slotted or bifurcated portion 30 that is slidably attached to the upper end of a wide arm or lever 31 fixed on a shaft or spindle 32 that is adapted to be rocked in bearings in the lower part of the casing 1 when the lever 31 is moved by transverse movement of the operating lever 26. Fixed on the said shaft 32 are cam levers 33 and 34 which are angularly disposed as shown in Figure 4. The cam lever 33 engages with a roller 35 which serves to connect the inner ends of two bell crank levers 36, 36 that are pivoted on pins 37 mounted in fixed bearings in the casing 1 the outer ends of these bell crank levers having pawls 38 (see Figures 4 and 4a) pivotally mounted thereon and co-operating therewith in such manner that the pivotal movement is resisted by the springs 39. These pawls 38 are adapted to engage with the locking dogs 12a on the annulus 12 at diametrically opposite points and they are so connected with the bell crank levers 36 that the springs serve as shock absorbers when the pawls engage with the dogs 12a for which purpose the springs 39 in the example shown are associated with plungers 39a that bear against curved abutments or restraining surfaces formed in the levers 36. Any suitable construction of resilient or shock absorbing pawls may be provided. The bell crank levers 36 are under the influence of springs 40 which tend to maintain the said levers in the position in which the pawls 38 are in engagement with the annulus dogs 12a. As it is necessary that the pawls 38 should not engage with the annulus dogs 12a except at such times when the annulus is stationary, balking or synchronizing means are provided, which in the example shown comprises a plate or ring 41 loosely mounted around a coned part on or of the diaphragm or web 1a on the gear box casing so that it is free to be maintained by the action of gravity in frictional contact with the end face or plate 13 of the annulus 12 for which purpose the ring 41 is provided with a frictional surface as shown in Figures 1, 3 and 5. This ring 41 is also provided with oppositely disposed notches 42 adjacent to each of which are two inclined stops or seatings 43 that can be engaged by inclined seatings on projections 44 on the said bell crank levers 36. The inclination of the said seatings is preferably about 6°. So long as each or either projection 44 engages with one of the inclined stops or seatings 43 the pawls 38 are maintained out of engagement with the annulus dogs 12a, but upon the said balking ring 41 being rotationally displaced for example by reason of its frictional contact with the annulus plate 13, the seatings 43 move away from the projections 44 so that the latter are free to enter the notches 42 in the plate 41 under the influence of the springs 40, which latter therefore at the same time cause the pawls 38 to engage with the annulus dogs 12a. Although the balking ring 41 is frictionally displaced as aforesaid the contact with the annulus face or plate 13 is sufficiently antifrictional owing to the loose mounting of the ring to avoid undue heating and wear by rotation of the annulus.

The other cam lever 34 on the shaft 32 engages with a roller 45 that connects two bell crank levers 46 pivoted at 47 similar to the bell crank levers 36 and carrying pawls 48 that are adapted to engage with the locking dogs 8a on the cage plate 8 the said pawls 48 co-operating with shock absorbing springs 49 in a similar manner to that described in connection with the pawls 38. Similar balking or synchronizing means are provided for preventing engagement of the locking pawls 48 with the cage dogs 8a, except at the proper time, these means comprising a balking ring 51 (see Figures 1, 3 and 5) having notches 52 and associated inclined faces or seatings 53 with which co-operate projections 54 on the bell crank levers 46 in a similar manner to that hereinbefore described with reference to the balking means associated with the locking pawls 38 that engage with the annulus dogs 12a. The bell crank levers 46 are acted upon by springs 50 as shown in Figures 5 and 8 to 11 and the balking ring 51 is adapted to be displaced by its contact with the face of the cage plate 8. The angular disposition of the aforesaid cam levers 33 and 34 is such that angular movement of the shaft 32 caused by transversely moving the operating lever 26 will, according to the direction of movement, cause either one or other of the said cam levers to move and operate the mechanism for withdrawing the respective locking pawls from engagement with the annulus dogs or the cage dogs, whilst subsequent movement in the same direction will displace the other cam lever and allow its respective pawls to be moved under the influence of the springs associated therewith towards engagement with the corresponding dogs on the annulus or cage, the engagement of either set of pawls 38 or 48 being permitted only when the balking ring 41 or 51 associated therewith is displaced as hereinbefore described. In order that either of the balking rings 41 or 51 can be displaced at will to release the locking pawls so that the latter can engage with their respective dogs, the cam levers 33 and 34 have associated therewith projections 33a and 34a respectively which are adapted to co-operate with lugs 41a and 51a on the balking rings when required. The projections 33a and 34a are adapted to engage with the said lugs 41a and 51a by imparting movement to the operating lever 26 beyond the normal amount required for gear changing, and when the operating lever is so moved, the said projections engage with the lugs for displacing the particular balking ring concerned, thus allowing its associated pawls to engage with the required dogs. For this purpose the operating lever 26 may be provided with a spring influenced catch 55 on the end of a sleeve having a plate 56 at its upper end adjacent to a knob or gripping piece 57 on the upper end of the operating lever, this knob or gripping piece being pivotally mounted on the said lever and provided with an arm 58 that can engage with the said plate 56. The operating lever is movable in a gate 60 having a medial or longitudinal slot 61 and lateral slots 62, 63, 64 and 65 disposed as shown in Figures 13 to 20 one end of the medial slot 61 extending beyond the slots 64 and 65 so as to form a notch 66 into which the operating lever can be moved and retained as hereinafter described. Longitudinal movement of the operating lever in either direction in the medial slot imparts sliding movement to the aforesaid sleeve 25 having the dogs 25a that can engage with the sets of dogs 2a, 7a, 9a and 13a. Transverse movement of the operating lever into the lateral slots on one side of the medial slot will operate the mechanism that enables the pawls say 38 to engage with the annulus dogs 12a while transverse movement of the operating lever in the other direction will operate the mechanism that enables the locking pawls 48 to engage with the cage dogs 8a as hereinafter described. The said catch 55 on the operating lever forms a stop for engaging with the ends of the lateral slots so as to limit the movement of the operating lever when this is actuated for the different forward speeds. By lifting the said plate 56 against the action of its associated spring while gripping the knob 57, the catch 55 can be raised so that it no longer acts as a stop, thus permitting the operating lever to be moved to the extra extent required for causing the projections 33a or 34a to engage with the balking ring lugs 41a or 51a so as to displace either of the balking rings 41 or 51. The said catch 55 also engages with projections 60a on the gate 60 for holding the operating lever 26 in neutral, while it can also engage with a catch 66a associated with a notch 66 when the operating lever is moved to engage top gear as hereinafter more fully described.

Figure 13 illustrates the gearing and the operating lever 26 in the position they occupy when the gearing is set for "reverse". In order to place the gearing in this position, the operating lever 26 is moved in the gate 60 to the end of the slot 61 opposite to the slot 62, this movement resulting in the sleeve 25 being axially or slidably displaced so that its dogs 25a are brought into engagement with the dogs 13a on the annulus 12. The operating lever 26 is then moved into the slot 62, this movement causing the aforesaid lever 31 to be operated in a direction which displaces the cam lever 34 to allow the spring 50 to actuate or tend to actuate the associated mechanism for causing the locking pawls 48 to engage with the dogs 8a on the cage plate 8 the other locking pawls 38 pertaining to the annulus external dogs 12a being maintained out of engagement so that the annulus is free to rotate. Figure 13 shows the dogs 25a and 13a engaged and the pawls 48 engaging with the cage dogs 8a, whilst the locking pawls 38a are shown out of engagement with the annulus external dogs 12a. When the parts are in the positions shown in this figure, the driving shaft 2 imparts rotation to the planet pinions 5 through the driving sun wheel 4 fixed on the said shaft 2 and as the planet pinions are held against rotation about the axis of the gearing by the locking pawls 48 engaging with the external cage dogs 8a on the cage 10 they revolve on their own axes. The larger planet pinions 5 which mesh with the internal teeth 15 of the annulus 12 therefore drive the annulus 12 in a direction opposite to the direction of rotation of the driving shaft and the sun wheel 4 fixed thereon, so that owing to the dogs 25a on the sleeve 25 which is splined on the driven shaft, being in engagement with the dogs 13a on the rotating annulus, the driven shaft 3 is rotated to provide the reverse drive. When moving the operating lever 26 into the slot 62 for "reverse", the balking ring 51 is usually in a position to prevent the locking pawls 48 from engaging with the external dogs 8a on the cage plate 8. The operating lever can therefore be moved to an extent required to enable one of the projections 34a on the cam lever 34 to engage with the appropriate lugs 51a on the balking ring 51 which is thereby displaced to allow the retaining projections 54 to move into the slots 52 (see Figure 11) and thus permit the pawls 48 to engage with the external dogs 8a on the cage plate 8 owing to the springs 50 acting on the bell crank levers 46.

In order to engage first or "emergency" low gear, the operating lever 26 is moved out of the slot 62 into the slot 61, which movement results in the cam lever 34 actuating the aforesaid mechanism for withdrawing the pawls 48 out of engagement with the dogs 8a on the cage whilst the other pawls 38 remain out of engagement with the dogs 12a on the annulus 12. Movement of the operating lever along the slot 61 towards the lateral slot 63 to the position shown in Figure 14 (which is a neutral position) results in the dogs 25a on the sleeve 25 being withdrawn from the internal dogs 13a on the annulus. The lever 26 is moved from the neutral position along the slot 61 to the slot 63 which results in the dogs 25a on the slidable sleeve 25 engaging with the internal dogs 9a on the cage plate 9 whilst the lateral movement of the lever 26 into the slot 63 causes the lever 31 and the shaft 32 to be rocked to displace the cam lever 33, which therefore releases the bell crank levers 36 so that they are moved by the springs 40 to cause the locking pawls 38 to engage with the annulus external dogs 12a and thus lock the annulus against rotation, the other locking pawls 48 being maintained out of engagement with the dogs 8a on the cage. In this position of the parts which is shown in Figure 15 the drive is transmitted from the driving shaft 2 and the fixed sun wheel 4 to the planet pinions 5, which, owing to the annulus being held against rotation by the locking pawls 38, revolve together with the free cage 10 around the axis of the gearing at a speed less than that of the driving shaft, so that the revolving cage which engages by means of its dogs 9a with the dogs 25a on the sleeve 25 splined to the driven shaft, drives the driven shaft at the reduced speed which represents first gear or "emergency" low speed. If the balking plate or ring 41 should be in a position to prevent the locking pawls 38 from engaging with the dogs 12a for instance in starting from rest, the displacing projections 33a on the cam lever 33 are caused to engage with the lug 41a on the balking plate by imparting extra movement to the operating lever 26 in the slot 63 after raising the catch 55 thus displacing the ring and allowing the locking pawls 38 to be moved into engagement with the annulus dogs 12a by the springs 40.

Movement of the operating lever 26 out of the slot 63 results in the locking pawls 38 being disengaged from the external dogs 12a on the annulus, and movement of the operating lever along the slot 61 to the neutral position shown in Figure 16 causes the sliding sleeve 25 to be axially displaced so that its dogs 25a are withdrawn from engagement with the internal cage dogs 9a. For the purpose of engaging second or ordinary low gear the operating lever 26 is moved along the middle slot 61 towards the slot 64 so as to slide the sleeve 25 in the direction for enabling its dogs 25a to engage with the internal dogs 7a on the driven sun wheel 7. Engagement of the said dogs 25a and 7a is however prevented by means of a balking or synchronizing ring 67 (see Figures 1 and 21 to 24) until such time as the driven sun wheel 7 and the driven shaft 3 with the sleeve 25 are rotating at the same speed. The balking ring 67 as shown more clearly in the enlarged fragmentary section view in Figure 21 is provided with a coned surface that bears against a mating surface on washer 68 made of an antifrictional material fixed within the said driven sun wheel 7 and it is also provided with internal projections 69 that can assume a position in the path of the dogs 25a on the slidable sleeve 25 to obstruct the latter and prevent them from engaging with the dogs 7a on the sun wheel 7. A support ring 70 having internal projections 71 that fit in splines 72 on the sleeve 25, is connected with the said balking ring 67 so as to be capable of rotating the latter, by means of a projection 73 on the balking ring engaging with a slot 74 in the support ring of such size that a limited rotational displacement of the balking ring can take place relatively to the support ring. At the time that the dogs 25a on the slidable sleeve 25 are about to engage with the dogs 7a on the driven sun wheel 7, the latter is rotating faster than the said sleeve 25 and the driven member 3 with the result that the balking ring 67 tends to be rotated by the sun wheel 7 by reason of the frictional contact with the washer 68, and its projections 69 are therefore held in the position shown in the developed plan view in Figure 22 to prevent engagement of the dogs 25a with the dogs 7a on the sun wheel 7. By decelerating the engine and reducing the speed of the driving shaft 2, the rotational speed of the sun wheel 7 will be decreased and when it tends to be less than that of the driven shaft 3, a frictional drag is exerted on the balking ring 67 by means of the washer 68, thus displacing the said balking ring 67 relatively to the support ring 70 owing to the lost motion between the projection 73 and the elongated slot 74, with the result that the balking ring projections 69 are moved out of the path of the dogs 25a, which can therefore be slid into engagement with the dogs 7a on the sun wheel 7 as shown in Figures 23 and 24 the said projections 69 passing between the dogs 25a and fitting in splines 75 in the slidable sleeve 25 so that the balking ring 67 is maintained in a definite position in which it is held aganst relative or unrequired rotational displacement during other operations of the gearing. The operating lever 26 can now be moved into the slot 64, (see Figure 17) to free or release the mechanism that tends to engage the locking pawls 48 with the external dogs 8a on the cage. At the time that the sun wheel 7 attains the same speed as that of the driven member 3, the planet cage 10 which had been rotating in a forward direction for "first gear" is decelerating and by the time that the operating lever 26 has been moved into the slot 64, the cage 10 has commenced to rotate in the reverse direction. This reverse rotation of the cage 10 maintains the synchronizer or balking plate or ring 51, which is in frictional contact with the cage plate 8 in a position in which its inclined seatings 53 are engaged by the seatings on the projections 54 of the bell crank levers 46 to prevent the locking pawls 48 from engaging with the external dogs 8a on the cage as shown in Figures 8 and 10. Upon accelerating the engine in the ordinary way, the cage will decelerate again and at the moment it stops and tends to reverse its direction of rotation, it will frictionally displace the synchronizer or balking plate or ring 51 so as to cause the seatings 53 thereon to be moved out of engagement with the balking projections 54 (see Figure 11) with the result that the pawls 48 are caused to engage with the external dogs 8a on the cage (see Figure 9) under the influence of the springs 50 at or about the moment that the cage is stationary. The parts are now in the position shown in Figure 17, and the drive is transmitted from the driving shaft 2 and the driving sun wheel 4 to the planet pinions 5 and 6, which, owing to the planet cage 10 being held against rotation by the locking pawls 48, revolve on their own axes the annulus being free at this time so that the smaller planet pinions 6 which are in mesh with the driven sun wheel 7 drive the latter at a speed less than that of the driving shaft, this reduced speed (which represents second gear or medium low speed) being imparted to the driven shaft 3 through the engaging sun wheel dogs 7a and the dogs 25a on the slidable sleeve 25 which is splined to the driven shaft. By moving the operating lever 26 out of the slot 64 into the slot 61, as shown in Figure 18, the locking pawls 48 are disengaged from the external dogs 8a on the cage and the gearing is therefore in a neutral position and although the sleeve dogs 25a remain engaged with the sun wheel dogs 7a because the slidable sleeve 25 has not been axially moved, the gearing merely rotates idly in this position.

In changing from second gear to third gear, the operating lever 26 is moved out of the slot 64 across the slot 61 and into the slot 65. The first part of this movement results in the mechanism being operated for withdrawing the locking pawls 48 from engagement with the cage dogs 8a as aforesaid in connection with Figure 18 whilst the latter part of the movement, i. e. from the position shown in Figure 18 into the slot 64 as shown in Figure 19 frees or releases the mechanism that tends to engage the locking pawls 38 with the external dogs 12a on the annulus 12. Actual engagement of the locking pawls 38 with the annulus dogs 12a is however prevented until the engine has decelerated to an extent which tends to reverse the direction of rotation of the annulus. At the moment the annulus stops and tends to rotate in the reverse direction, it displaces the balking plate or ring 41 by frictional contact therewith so that the seatings 43 on the said ring 41 move away from the balking projections 44 on the bell crank levers 36 thus releasing the locking pawls 38 and permitting them to engage with the external dogs 12a on the annulus under the influence of the springs 40 at or about the moment the annulus is stationary. The slidable sleeve 25 is not axially displaced in changing from the second gear to third gear, so that the dogs 25a on this sleeve remain in engagement with the internal dogs 7a on the sun wheel 7. The various parts are now in the position illustrated in Figure 19 and the drive is transmitted from the driving shaft 2 through the sun wheel 4 so as to rotate the planet cage 10 and the planet pinions about the axis of the gearing, the planet pinions revolving about their own axes owing to the larger pinions 5 revolving in mesh with the internal teeth 15 of the annulus 12 which is now locked by the pawls 38 so that the sun wheel 7 is driven by the smaller planet pinions 6 at a speed less than that of the driving shaft 2 this speed which is higher than that imparted when the parts are in the position shown in Figure 17 and which represents "third gear or high speed" being imparted to the driven shaft 3 through the engaging sun wheel dogs 7a and the dogs 25a on the sleeve 25 splined on the driven shaft.

When it is desired to change from third gear to second gear the operating lever 26 is merely moved out of the slot 65 into the slot 64 and the engine accelerated in the usual way.

In changing from third gear to top gear the operating lever 26 is moved out of the slot 65 and into the slot 66. The initial or lateral movement of the lever 26 into the medial slot 61 as shown in Figure 18 causes the mechanism to be operated for moving the locking pawls 38 out of engagement with the external dogs 12a on the annulus 12 and the further movement of the said lever towards and into the slot or notch 66, which is an extension of the medial slot 61, tends to move the slidable sleeve 25 so that its dogs 25a will engage with the dogs 2a on the driving shaft 2. The engagement of the dogs 25a and 2a is however prevented while the driving shaft 2 and the driven shaft 3 are rotating at different speeds by means of a balking or synchronizing ring 76 (see Figures 1 and 25 to 28) which is provided with projections 77 having 6° inclined faces or seatings that are adapted to be engaged by similar inclined faces or seatings on projections 78 formed at the end of the sleeve 25. At the time that the sleeve dogs 25a are moved towards engagement with the dogs 2a, the driving shaft 2 is rotating faster than the driven shaft 3 so that frictional contact between an anti-frictional washer 79 carried by the driving shaft and the coned surface of the balking ring 76 will maintain this ring in the position shown in Figures 25 and 26, in which its projections 77 are engaged by the projections 78 on the sleeve 25 thus holding the sleeve dogs 25a out of engagement with the dogs 2 on the driving shaft 2 this position being shown more clearly in the developed plan view in Figure 26. Upon decelerating the engine, the speed of the driving shaft will equal and tend to fall below that of the driven shaft 3 and the slidable sleeve 25 thereon, thus causing a frictional drag on the said balking ring 76 which is therefore displaced to move the seatings on its projections 77 away from the seatings on the sleeve projections 78 which latter can now move into recesses 80 in the balking ring 76 (see Figures 27 and 28) with the result that the sleeve 25 in moving forward causes its dogs 25a to engage synchronously with the dogs 2a thus directly connecting the driving shaft 2 with the driven shaft to provide top speed. In this position of the parts, which is shown in Figure 20, the two sets of locking pawls 38 and 48 are maintained in the unlocked positions, leaving the cage and the annulus free. As shown in this figure, the dogs 25a on the slidable sleeve 25, in addition to engaging with the dogs 2a, are also in engagement with the dogs 7a on the sun wheel 7, but owing to the annulus and the cage being free this engagement of the dogs 25a and 7a merely results in the gearing rotating bodily about the axes of the driving and driven shafts. In order to avoid the necessity of maintaining hand pressure on the operating lever 26 after being moved into the slot 66 for top gear until such time as the driving member 2 and the driven member 3 are rotating at the same speed the said lever is constituted by two parts that are pivotally connected with an interposed spring 59 (see Figure 3) and when the lever is placed in the slot 66 it is locked therein by means of the catch 55 engaging a stop 66a on the gate 60 so that whilst the operating lever is maintained in this position, the spring 59 is compressed, thus acting on the lower part of the lever and tending to move it and the sleeve 25 in the direction for engaging the sleeve dogs 25a with the driving dogs 2a when speed synchronization takes place as aforesaid. To move the operating lever 26 out of the "top gear" slot or notch 66 it is pulled or pushed by gripping the knob 57 which being pivotally mounted on the lever 26 is displaced to raise the arm 58 and thus lift the plate 56, thereby releasing the catch 55 from engagement with the stop 66a. This catch 55 can engage with either of the two transverse stops 60a on the gate 60 to hold the operating lever 26 in either of the two neutral positions shown in Figure 14 or Figure 16.

In changing from second gear to top gear, the operation is similar to that described for changing from third gear to top gear. In changing from top gear to second gear or to third gear, the operating lever is moved from the slot or notch 66 into the slot 65 for third gear, or into the slot 64 for second gear, and the engine is accelerated as required.

It will be observed that in connection with the internal balking or synchronizing means comprising the rings 67 and 76 as well as in connection with the external balking or synchronizing means comprising the balking rings 41 and 51, a pair of inclined stops or seatings is associated with each of the openings or recess into which the balking projection can enter when the rotational or static synchronization takes place, the seatings associated with each opening being arranged one on each side of the latter, so that the balking projection can engage with either one or the other. If during gear changing the point of rotational synchronism in connection with the internal balking means or static synchronism in connection with the external balking means should be allowed to pass so that a balking projection does not engage with the seating on one side of the opening or recess, the projection will however engage with the second seating on the other side of the opening or recess to prevent engagement or locking of the parts to be connected, and synchronism can be brought about again by acceleration or deceleration of the engine according to requirements for enabling the driving dogs or locking means to engage as hereinbefore described.

In the example of the gearing illustrated, the provision of the external dogs 8a on the planet cage member and also the external dogs 12a on the annulus member, enable a positive bi-directional drive through material under shear load to be obtained under all conditions, and owing to the aforesaid locking means for engaging the said dogs operating at the time static synchronization takes place, the locking of the said members can be effected without shock, the resilient pawls also assisting in enabling smooth engagement or locking to be effected. Although the means for enabling a positive bi-directional drive through material under shear load may be preferred in most cases, the aforesaid balking or synchronizing means for enabling locking to be effected when static synchronization takes place, may be applied to constructions of gearing in which the planet cage and the annulus can be held against rotation by the application of frictional means. An example of this modification is illustrated in Figure 29, which shows a construction comprising operating mechanism generally similar to that illustrated in Figure 4, but the bell crank levers 36 which carry the balking projections 44 have associated therewith short levers 82 that are connected at 83 to the free ends of longer levers 84 pivotally mounted at 85 to a fixed part of the casing. These longer levers 84 have pivotally attached thereto braking shoes 86 which are adapted to engage with a suitable external surface on the annulus in the one case, whilst similar mechanism is provided for enabling brake shoes to engage with a suitable external surface on the planet cage. By means of the construction illustrated in Figure 29, the leverage provided by the short levers 82 and the longer levers 84 is such as to cause the brake shoes to be forced with sufficient pressure against the annulus (or the cage) under the influence of the springs 40 for example to hold the annulus (or the cage) against rotation. This construction has the advantage that the frictional engagement is effected at the time that the annulus (or the cage) is stationary, so that difficulties such as are encountered when frictional surfaces engage with rotating parts are avoided. Instead of providing a balking member in the form of a plate or ring such as 41 or 51 as hereinbefore referred to, I may provide a balking member in the form of a kind of shoe which can engage with the peripheral or other part of the annulus or the cage under the influence of spring or other pressure, the said member having inclined faces or other stops that can be engaged by a pawl or pivoted dog member in such manner that the balking member maintains the said pawl or dog out of engagement with the dogs on the annulus or the cage until such time as the annulus or the cage comes to a standstill as hereinbefore described. An embodiment of this kind may also be applied to the frictional gripping or locking means described in connection with Figure 29.

What I claim and desire to secure by Letters Patent of the United States is:—

1. Epicyclic gearing comprising a driving sun-member and a planet-carrying member carrying a compound planet thereon, a driven sun-member having a hollow annular formation to adapt it to receive clutching-means, an internally toothed annular member, and means for rotatably connecting the said members with the driven shaft, the driving sun-member being provided with a roller-bearing surface, the larger planets of the compound planet pinions having rollers engaged therewith, said rollers revolving around the rollers of the driving sun-member, a roller track on the internally toothed annular member for the said planet rollers, the driven sun wheel having rollers thereon, roller-bearing surfaces for the smaller planets of the compound planet pinions, said latter rollers being engaged by the rollers on the driven sun wheel, whereby the driven sun wheel is externally supported.

2. Epicyclic gearing as in claim 1, in which the driven sun member is provided with rollers on each side of its teeth, the smaller planets having rollers thereon, said rollers being engaged by the said rollers on the driven sun member, the driven sun member being of annular or hollow formation whereby clutch means may be moved within, into and through it.

3. Epicyclic gearing as in claim 1, in which the smaller planet of the compound planet engages a roller-bearing surface, the larger planet of the compound planet also engaging a roller-bearing surface, the first mentioned roller having another roller engaging therewith, the diameter of said last roller being equal to that of the roller of the larger planet.

4. Epicyclic gearing as in claim 1, and including a roller track on the toothed annular member, the larger planet of the compound planet gear having a roller in engagement therewith, and a third roller having a diameter equal to that of the roller of the larger planet gear, said third roller travelling in said roller track on the annular member.

5. Epicyclic gearing as in claim 1, in which the various roller-bearing surfaces fitted to the flanged track are formed separate and detachable from the gear members to facilitate assembling of the gearing.

6. Epicyclic gearing, comprising, in the train of gear wheels, a sun wheel which is unsupported at its center and is hollow and annular to adapt it to receive clutching-means, roller bearing means on said sun wheel, and rollers engaging with said bearing means so as to support this gear wheel externally.

7. Epicyclic gearing, comprising, in the train of gear wheels, a sun wheel which is unsupported at its center and is hollow and annular to adapt it to receive clutching-means, roller bearing means on said sun wheel, a gear wheel meshing with said sun wheel, and rollers associated with said gear wheel to engage with the roller bearing means on the sun wheel to support the latter externally.

8. Epicyclic gearing, comprising, in the train of gear wheels, a sun wheel which is unsupported at its center and is hollow and annular to adapt it to receive clutching means, roller bearing surfaces on each side of the sun wheel, a gear wheel meshing with said sun wheel, and rollers on each side of said gear wheel for engaging with the roller bearing surfaces on the sun wheel so as to support the latter externally.

9. Epicyclic gearing, comprising, in the train of gear wheels, a toothed annulus and an annular sun wheel which is unsupported at its center, a roller bearing surface on each side of said sun wheel, a gear wheel meshing with the latter, and rollers on each side of this gear wheel engaging with the roller bearing surfaces on the sun wheel to support the latter externally, one of the rollers associated with the gear wheel being formed with a second and larger roller for engaging with a roller track in the toothed annulus forming a part of the epicyclic train.

10. Epicyclic gearing, comprising, in the train of gear wheels, a toothed annulus and an annular sun wheel which is unsupported at its center, roller bearing surfaces on said sun wheel, a planet pinion forming part of a compound planet in mesh with said sun wheel and having rollers on each side for engaging with the roller bearing surfaces on the sun wheel, and larger rollers at the ends of the compound planet for engaging with roller tracks in the toothed annulus forming part of the epicyclic train, the roller adjacent to the larger planet also revolving around a roller bearing surface associated with the driving sun wheel.

11. Epicyclic gearing, comprising, in the train of gear wheels, a toothed annulus and an annular sun wheel which is unsupported at its center, roller bearing surfaces on said sun wheel, a planet pinion forming part of a compound planet in mesh with said sun wheel and having rollers on each side for engaging with the roller bearing surfaces on the sun wheel, larger rollers at the ends of the compound planet for engaging with roller tracks in the toothed annulus forming part of the epicyclic train, the roller adjacent to the larger planet also revolving around a roller bearing surface associated with the driving sun wheel, all the said gear wheels having helically formed teeth and flanged side bearing surfaces associated with the rollers and roller bearing surfaces to take axial thrust due to the helical gear wheels.

12. Epicyclic gearing, comprising, in the train of gear wheels, a toothed annulus and an annular sun wheel which is unsupported at its center, roller bearing surfaces on said sun wheel, a planet pinion forming part of a compound planet in mesh with said sun wheel and having rollers on each side for engaging with the roller bearing surfaces on the sun wheel, larger rollers at the ends of the compound planet for engaging with roller tracks in the toothed annulus forming part of the epicyclic train, the roller adjacent to the larger planet also revolving around a roller bearing surface associated with the driving sun wheel, and flanges or side bearing surfaces associated with the said rollers and roller bearing surfaces to take axial thrust and prevent endwise displacement of the gear wheels.

13. Epicyclic gearing, comprising a driving sun member, a planet carrying member, a compound planet carried thereon, a driven sun member of annular formation, an internally toothed annular member, roller bearing members the diameters of which are substantially equal to the diameters of the pitch circles of the gear wheels with which they are associated, and side flanges located on the pitch circle roller bearing members.

PIERO MARIANO SALERNI.